United States Patent [19]
Sullivan

[11] Patent Number: 5,387,065
[45] Date of Patent: Feb. 7, 1995

[54] REUSABLE PIN AND GROMMET FASTNER

[75] Inventor: Kathleen A. Sullivan, Kankakee, Ill.

[73] Assignee: Illinios Tool Works Inc., Glenview, Ill.

[21] Appl. No.: 84,384

[22] Filed: Jun. 29, 1993

[51] Int. Cl.⁶ .............................................. F16B 13/06
[52] U.S. Cl. ................................... 411/48; 411/45; 411/510
[58] Field of Search ................ 411/41, 45, 49, 48, 411/46, 47, 182, 357, 510, 913

[56] References Cited
U.S. PATENT DOCUMENTS

| | | | |
|---|---|---|---|
| 2,741,938 | 4/1956 | Johnson | 411/357 |
| 3,385,157 | 5/1968 | Rapata | 411/41 |
| 3,918,130 | 11/1975 | Poe | 411/41 X |
| 4,610,587 | 9/1986 | Wollar et al. | 411/45 X |
| 4,668,145 | 5/1987 | Hirohata | 411/508 |
| 4,716,633 | 1/1988 | Rizo | 24/453 |
| 4,759,670 | 7/1988 | Under et al. | 411/43 |
| 4,840,523 | 1/1989 | Oshida | 411/48 |
| 4,861,208 | 8/1989 | Boundy | 411/339 |
| 5,290,137 | 3/1994 | Duffy, Jr. | 411/41 X |

Primary Examiner—Rodney M. Lindsey
Attorney, Agent, or Firm—Schwartz & Weinrieb

[57] ABSTRACT

A reusable pin and grommet fastener where the grommet includes a head, a shank, an axial bore extending through the head and shank and two legs flexibly hinged to a distal end of the shank and extending outwardly away from the shank with a slight taper toward the bore. The pin includes a shank with a tapered distal end and a plurality of grooves formed about the shank so that after initial insertion of the grommet within an aperture of an article the pin can be inserted within the bore of the grommet to lock the grommet in the aperture of the article and the legs of the grommet readily can flex outwardly with a slight insertion force until seated within a groove of the pin which retain the pin in the grommet with a substantial predetermined removal force that nevertheless enables removal of the pin without damaging either the pin or the grommet.

12 Claims, 1 Drawing Sheet

REUSABLE PIN AND GROMMET FASTNER

BACKGROUND OF THE INVENTION

1. Field of the Invention

This invention relates generally to pin and grommet fasteners, and more particularly to a reusable pin and grommet fastener which can be front mounted or "blindly" assembled where the grommet can initially retain itself within an aperture of an article and can accept and releasably retain a pin which locks the grommet within the aperture when the pin is inserted with a slight insertion force and is retained with a substantial removal force that nevertheless enables removal of the pin without damaging either the pin or the grommet.

2. Description of the Related Art

Various types of fasteners are utilized in manufacturing to blindly secure two articles or panels together. An example of such a fastener is illustrated in U.S. Pat. No. 4,840,523 which discloses an outer cylinder or grommet and an insertion member or pin for insertion and retention within the grommet.

Such a fastener, however, relies on expansion of the entire grommet shank for insertion and retention of the pin. Thus, a substantial amount of insertion force is necessary to seat the pin in a desired position. Additionally, the grommet shank is utilized for initial retention of the grommet within an aperture of the article as well as retention of the pin. Furthermore, to insert the pin, axial ribs on the pin must be aligned with corresponding slots in the grommet shank which can be difficult to achieve in a blind operation.

It would therefore be desirable to provide a reusable pin and grommet fastener where the pin can be inserted into the grommet without the need for rotational alignment and with a substantially reduced insertion force yet retained within the grommet with a substantial retention force where the grommet structure which retains the pin is independent from the grommet structure which retains the grommet within the aperture of the article.

SUMMARY OF THE INVENTION

The invention provides a reusable pin and grommet fastener which is particularly useful for blind assembly of one article to another article where the grommet includes a head, a shank, an axial bore extending through the head and shank and two legs flexibly hinged to a distal end of the shank and extending outwardly away from the shank with a slight taper toward the bore. The pin includes a shank with a tapered distal end and a plurality of grooves formed about the shank.

After initial insertion of the grommet within an aperture of an article, the pin can be inserted within the bore of the grommet so as to lock the grommet in the aperture. Upon further insertion of the pin in the bore of the grommet, the legs of the grommet can readily flex outwardly with a slight insertion force until seated within a groove of the pin. In this position, the legs retain the pin in the grommet with a substantial predetermined removal force that nevertheless enables removal of the pin without damaging either the pin or the grommet.

BRIEF DESCRIPTION OF THE DRAWINGS

Various other objects, features, and attendant advantages of the present invention will be more fully appreciated from the following detailed description, when considered in connection with the accompanying drawings, in which like reference characters designate like or corresponding parts throughout the several views, and wherein.

DESCRIPTION OF THE PREFERRED EMBODIMENTS

Figure 1:
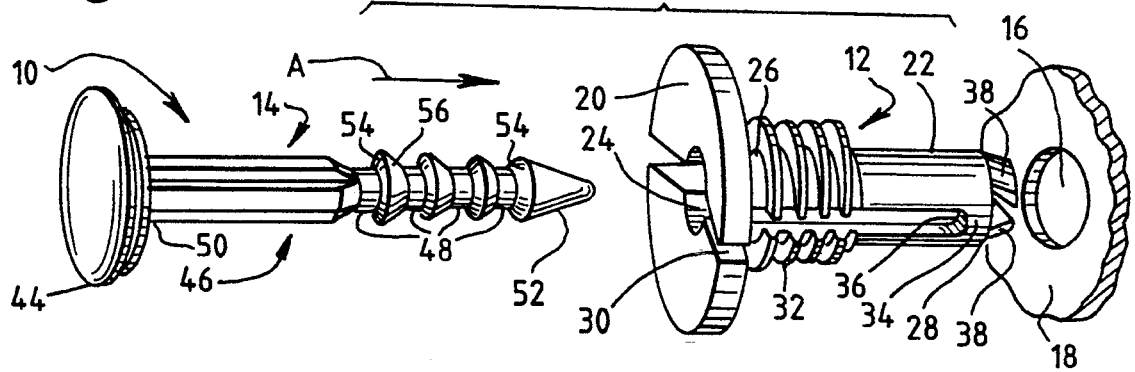
FIG. 1 is a perspective exploded view of the pin and grommet fastener of the invention.

Referring to FIG. 1, the fastener of the invention is designated generally by the reference numeral 10. The fastener 10 includes two members, a grommet 12 and a pin 14 and is designed for insertion and retention within an aperture 16 of an article 18.

Preferably, the fastener 10 is utilized for connecting a trim panel (not illustrated) which is connected to the pin 14 to another article 18, such as sheet metal. It is to be understood, however, that the fastener 10 can be utilized in a variety of applications, including attaching two panels together, without departing from the teachings of the present invention.

Figure 6:
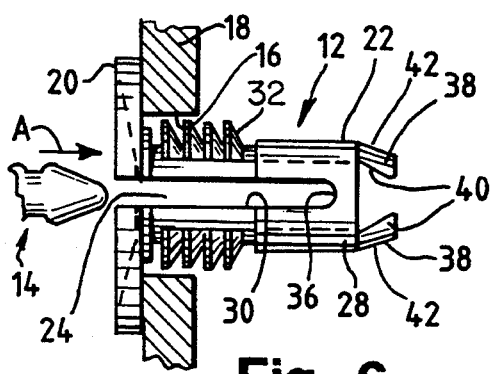
FIG. 6 is a side elevational view of the grommet of the invention illustrated inserted within an aperture of an article.
Figure 7:
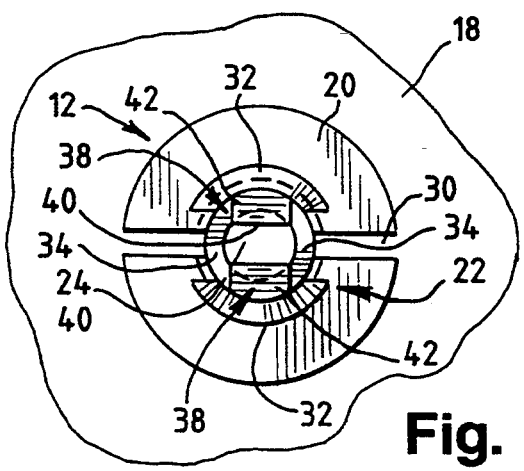
FIG. 7 is a bottom plan view of the grommet illustrated in FIG. 6.

As FIGS. 1, 6 and 7 illustrate, the grommet 12 includes a head 20, a shank 22 and an axial bore 24 extending completely through the head 20 and shank 22. To assist in insertion of the pin 14 within the grommet 12, especially in a blind installation, the head 20 is preferably tapered toward the bore 24.

The shank 22 includes a first proximal end 26 integrally formed with the head 20 and a second distal end 28 which extends outwardly away from the head portion a predetermined distance. To assist in initial insertion and retention of the shank 22 within the aperture 16, a slot 30 and at least one set of fins 32 are preferably provided.

The slot 30 extends through the center of the head 20, the bore 24 and the shank 22 to a position proximate the distal end 28 of the shank 22. Accordingly, the slot 30 separates the grommet 12 into two substantially mirror image halves which are interconnected by two bridge portions 34 formed on opposite sides of the bore 24 by the material remaining between a bottom 36 of the slot 30, the bore 24 and the distal end 28 of the shank 22.

Accordingly, the slot 30 enables the two halves of the grommet 12 to flex inward toward the bore 24 for ease of insertion within the aperture 16. Upon release of the grommet halves, the grommet 12 flexes outward within the aperture 16 to initially retain the grommet 12 therein with an initial retention force. The fins 32 provide resilient engagement with the aperture 16 and allow for the grommet 12 to be utilized with articles 18 of varying thicknesses.

To retain the pin 14 within the grommet 12, the distal end 28 of the grommet shank 22 includes at least two flexibly hinged legs 38 integrally formed in one piece therewith. The legs 38 extend outwardly away from the distal end 28 a predetermined distance, are slightly tapered toward the bore 24 and function independently from the slot 30 and fins 32.

An inside surface 40 of each leg 38 is preferably formed as a flat planar surface, but can be arcuate to substantially match the curvature of the bore 24. An outside surface 42 of each leg 38 is preferably arcuate and tapered for ease of insertion of the shank 22 within the aperture 16.

Figure 4:
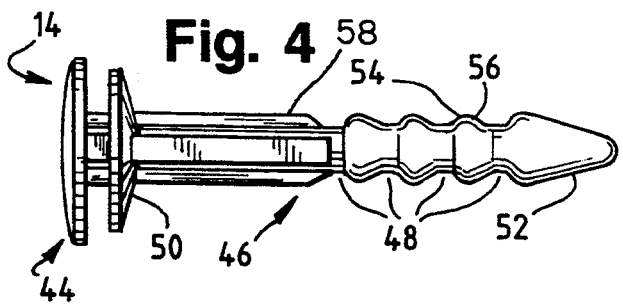
FIG. 4 is a side elevational view of the pin of the invention.
Figure 5:
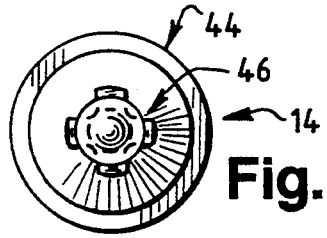
FIG. 5 is a bottom plan view of the pin illustrated in FIG. 4.

As FIGS. 1, 4 and 5 illustrate, the pin 14 includes a head 44, a shank 46 and a plurality of grooves 48 formed thereon. Preferably the head 44 is a double headed member for insertion within a slot or "doghouse" of a trim panel or the like to attach the pin 14 to the panel. Alternatively, the pin 14 can be formed with any desired structure for attaching another article, such as a panel, thereto.

The pin shank 46 includes a first proximal end 50 integrally formed with the head 44 and a second distal end 52. To assist in insertion of the pin 14 within the bore 24 of the grommet 12, the distal end 52 of the pin 14 is preferably tapered.

Figure 2:
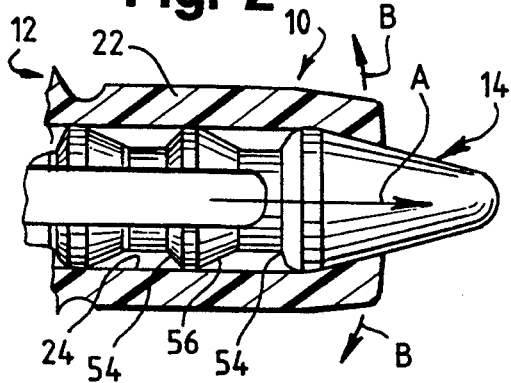
FIG. 2 is an enlarged partial cross-sectional view of the pin initially positioned within the grommet illustrating outward flexing of the legs of the grommet shank.
Figure 3:
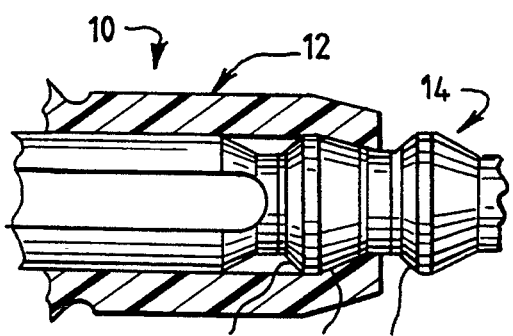
FIG. 3 is an enlarged partial cross-sectional view, similar to FIG. 2, illustrating locking of the pin with the legs of the shank.

The shank 46 preferably includes four grooves 48, but the number and position of the grooves 48 can vary. Each groove 48 is defined on one side by a shoulder portion 54 and on another side by a ramped portion 56. Thus, as FIG. 2 illustrates, upon insertion of the pin 14 within the grommet 12, the legs 38 slide along each ramped portion 56 to outwardly flex in the direction of arrow "B" until seated within a desired groove 48 and are retained therein by the shoulders 54 as described in detail below.

To assist in guiding and centering the pin shank 46 within the aperture 24 of the grommet 12, the shank 46 preferably includes a plurality of axially spaced centering ribs 58 positioned between the grooves 48 and the head 44. The ribs 58, however, do not require any type of orientation with respect to the bore 24.

To assemble two articles with the fastener 10, the grommet 12 is first inserted within the aperture 16 of the article 18 as illustrated in FIG. 6 by first flexing the grommet 12 inward toward the bore 24, inserting the shank 14 within the aperture 16 and releasing the grommet 12. Upon release, the grommet 12 flexes outward to enable the fins 32 to contact the article 18 to retain the grommet 12 therein with an initial retention force.

The pin 14 is then inserted within the bore 24 in the direction of arrow "A" as illustrated in FIGS. 1 and 6. Preferably, the pin 14 is dimensioned to slightly expand the grommet 12 outward to lock the grommet 12 within the aperture 16. The pin 14, however, can be dimensioned so that a large or small outward force is provided to the grommet 12, or with no outward force at all, to vary the initial retention force of the grommet 12 within the aperture 16. Since the pin 14 prevents the two halves of the grommet 12 from flexing inward, the grommet 12 is locked in the aperture 16 until the pin 14 is removed.

Upon continued insertion of the pin 14 within the bore 24, the distal end 52 of the pin 14 contacts the legs 38 of the grommet. Upon further insertion of the pin 14, the legs 38 readily flex outwardly with respect to the bore 24 due to the contact with the tapered distal end 52 and the ramped portions 56 to clear a shoulder 54 and seat within a respective groove 48. The number and position of the grooves 48 and corresponding shoulders 54 can vary to accommodate a particular application.

The grooves 48 thus provide a ratchet type engagement with the legs 38. The shoulders 54 prevent removal until a substantial removal force, which can vary depending on the design of the legs 38 and shoulders 54, is applied to the pin 14. Thus, the insertion force is substantially minimal while the removal force is substantially large.

To remove the pin 14 from the grommet 12, the pin 14 is merely pulled with a removal force sufficient to enable the legs 38 to clear the shoulders 54. Due to the flexibility of the legs 38 and the design of the pin 14, such a removal force does not damage either the pin 14 or the grommet 12.

Modifications and variations of the present invention are possible in light of the above teachings. It therefor is to be understood that within the scope of the appended claims, the invention may be practiced other than as specifically described.

What is claimed and desired to be secured by letters patent is:

1. A reusable pin and grommet fastener, comprising:
a grommet having a head member, a shank member, and an axial bore extending through said head member and said shank member, said shank member having a first proximal end integrally formed with a back side of said head member and a second distal end extending longitudinally away from said head member, a slot extending through the center of said head member, said shank member, and said bore and terminating at a position proximate said distal end of said shank member so as to divide said grommet into two substantially similar halves which are flexibly interconnected together at said distal end of said shank member by two bridge portions, disposed upon opposite sides of said bore and formed by a remaining portion of said shank member defined between a bottom portion of said slot, said bore, and said distal end of said shank member, for permitting said grommet to be easily inserted into an aperture of an article with a first minimal insertion force, and a pair of legs flexibly hinged to said distal end of said shank member upon the opposite longitudinal side of said two bridge portions as that of said slot; and
a pin having a shank portion, including a first proximal end and a second tapered distal end, for insertion within said bore of said grommet so as to expand said halves of said grommet into contact with sidewall portions of said aperture of said article whereby said grommet is retained within said aperture of said article, and a plurality of grooves formed about peripheral portions of said second tapered distal end of said pin shank portion for alternatively outwardly flexing and accommodating said legs of said shank member of said grommet so as to permit said pin to be accommodated within said grommet and to retain said pin within said grommet with a second substantial retaining force that nevertheless enables removal of said pin from said grommet without damaging either said pin or said grommet.

2. The fastener as defined in claim 1 wherein said pin includes a head portion integrally formed with said first proximal end thereof, said head portion being capable of retaining another article thereto.

3. The fastener as defined in claim 1 wherein a second front side of said head of said grommet is tapered toward said axial bore to assist in insertion of said pin.

4. The fastener as defined in claim 1 wherein said shank member of said grommet includes at least one set of flexible fins formed therewith to assist in initially retaining said grommet within said aperture and accommodating a variety of thicknesses of said article.

5. A fastener as set forth in claim 1, wherein:
said legs of said shank member of said grommet extend radially inwardly from radially outward peripheral portions of said shank member of said grommet toward a longitudinal axis of said shank member.

6. A fastener as set forth in claim 5, wherein:
said grooves of said shank portion of said pin comprise ramp portions for permitting said legs of said shank member of said grommet to move relatively easily thereover when said pin is inserted into said grommet, and shoulder portions for engaging said legs of said shank member of said grommet for preventing ready withdrawal of said pin from said grommet.

7. A reusable pin and grommet fastener, comprising:
a grommet having a head member, a shank member, and an axial bore extending through said head member and said shank member, said shank member having a first proximal end integrally formed with a back side of said head member and a second distal end extending longitudinally away from said head member, a slot extending through the center of said head member, said shank member, and said bore and terminating at a position proximate said distal end of said shank member so as to divide said grommet into two substantially similar halves which are flexibly interconnected together at said distal end of said shank member by two bridge portions, disposed upon opposite sides of said bore and formed by a remaining portion of said shank member defined between a bottom portion of said slot, said bore, and said distal end of said shank member, for permitting said grommet to be easily inserted into an aperture of an article with a first insertion force, and a pair of legs flexibly hinged to said distal end of said shank member upon the opposite longitudinal side of said two bridge portions as that of said slot; and
a pin having a shank portion, including a first proximal end and a second tapered distal end, for insertion within said bore of said grommet so as to expand said halves of said grommet into contact with sidewall portions of said aperture of said article whereby said grommet is retained within said aperture of said article, and a plurality of grooves formed about peripheral portions of said second tapered distal end of said pin shank portion for alternatively outwardly flexing said legs of said shank member of said grommet with a second insertion force, independent of said first insertion force of said grommet as defined by said flexibly interconnected grommet halves, and for accommodating said legs of said shank member of said grommet so as to permit said pin to be accommodated and retained within said grommet with a third retaining force which is substantially greater than said second insertion force but which nevertheless enables removal of said pin from said grommet without damaging either said pin or said grommet.

8. A fastener as set forth in claim 7, wherein:
said shank member of said grommet comprises a plurality of flexible fins integrally formed upon axially spaced peripheral portions of said shank member for flexibly engaging said sidewall portions of said aperture of said article in order to insure retention of said grommet within said aperture of said article.

9. A fastener as set forth in claim 7, wherein:
said pin comprises a head portion integrally formed with said first proximal end of said shank portion for retaining another article between said head portion of said pin and said head member of said grommet.

10. A fastener as set forth in claim 7, wherein:
a front side of said head member of said grommet is tapered toward said axial bore so as to facilitate insertion of said pin into said grommet bore.

11. A fastener as set forth in claim 7, wherein:
said legs of said shank member of said grommet extend radially inwardly from radially outward peripheral portions of said shank member of said grommet toward a longitudinal axis of said shank member.

12. A fastener as set forth in claim 11, wherein:
said grooves of said shank portion of said pin comprise ramp portions for permitting said legs of said shank member of said grommet to move relatively easily thereover when said pin is inserted into said grommet, and shoulder portions for engaging said legs of said shank member of said grommet for preventing ready withdrawal of said pin from said grommet.

* * * * *